(12) United States Patent
Banister

(10) Patent No.: US 11,771,017 B2
(45) Date of Patent: Oct. 3, 2023

(54) METHOD OF CONSERVING IRRIGATION WATER USING A WOVEN FABRIC SUBSTRATE

(71) Applicant: Mark Banister, Tucson, AZ (US)

(72) Inventor: Mark Banister, Tucson, AZ (US)

(*) Notice: Subject to any disclaimer, the term of this patent is extended or adjusted under 35 U.S.C. 154(b) by 251 days.

(21) Appl. No.: 16/073,708

(22) PCT Filed: Jan. 30, 2017

(86) PCT No.: PCT/US2017/015663
§ 371 (c)(1),
(2) Date: Jul. 27, 2018

(87) PCT Pub. No.: WO2017/132680
PCT Pub. Date: Aug. 3, 2017

(65) Prior Publication Data
US 2019/0037783 A1     Feb. 7, 2019

Related U.S. Application Data

(60) Provisional application No. 62/289,022, filed on Jan. 29, 2016.

(51) Int. Cl.
*A01G 13/02* (2006.01)
*C02F 1/28* (2023.01)
(Continued)

(52) U.S. Cl.
CPC .......... *A01G 13/0275* (2013.01); *B01J 20/24* (2013.01); *B01J 20/261* (2013.01); *B01J 20/262* (2013.01);
(Continued)

(58) Field of Classification Search
CPC ............ A01G 13/0256; A01G 13/0268; A01G 13/0275; B01J 20/24; B01J 20/261;
(Continued)

(56) References Cited

U.S. PATENT DOCUMENTS

| | | | |
|---|---|---|---|
| 6,399,185 B1 * | 6/2002 | Cathey | A01G 13/00 428/221 |
| 6,681,521 B1 * | 1/2004 | Holloway | A01C 1/042 47/56 |

(Continued)

FOREIGN PATENT DOCUMENTS

| | | | | |
|---|---|---|---|---|
| CN | 103059318 | 4/2013 | | |
| EP | 0610056 | 6/2002 | ............ | A61L 15/60 |

(Continued)

OTHER PUBLICATIONS

Ahmed, "Hydrogel: Preparation, characterization, and applications: A review", Journal of Advanced Research, Production and hosting by Elsevier B.V. on behalf of Cairo University, 2015, pp. 105-121.

(Continued)

*Primary Examiner* — Brady W Frazier
(74) *Attorney, Agent, or Firm* — HAYES SOLOWAY P.C.

(57) ABSTRACT

A woven fabric formed of fabric fibers or threads coated with a hydrogel, wherein said hydrogel is not crosslinked or is partially crosslinked to the fabric fibers or thread, wherein the hydrogel has a number of excess reactive molecules that are available for a reaction with one or more molecules solvated in an aqueous solution, and wherein the reactive molecules of the hydrogel can reversibly bond with the molecules solvated in an aqueous solution, such that the reactive molecules of the hydrogel attract the molecules solvated in aqueous solution when the hydrogel coated fabric substrate is exposed to an aqueous solution.

3 Claims, 6 Drawing Sheets

(51) Int. Cl.

| | |
|---|---|
| *C08G 59/18* | (2006.01) |
| *C08L 63/10* | (2006.01) |
| *C08L 63/00* | (2006.01) |
| *C08G 59/00* | (2006.01) |
| *B01J 20/24* | (2006.01) |
| *B01J 20/26* | (2006.01) |
| *B01J 20/28* | (2006.01) |
| *B01J 20/32* | (2006.01) |
| *C02F 1/469* | (2023.01) |
| *D06N 3/00* | (2006.01) |
| *D06N 3/12* | (2006.01) |
| *C02F 103/06* | (2006.01) |
| *C02F 101/16* | (2006.01) |
| *C02F 101/20* | (2006.01) |
| *C02F 103/08* | (2006.01) |

(52) U.S. Cl.
CPC ... *B01J 20/28038* (2013.01); *B01J 20/28047* (2013.01); *B01J 20/321* (2013.01); *B01J 20/3272* (2013.01); *B01J 20/3295* (2013.01); *C02F 1/285* (2013.01); *C02F 1/288* (2013.01); *C02F 1/469* (2013.01); *C08G 59/00* (2013.01); *C08G 59/18* (2013.01); *C08L 63/00* (2013.01); *C08L 63/10* (2013.01); *D06N 3/0006* (2013.01); *D06N 3/0011* (2013.01); *D06N 3/0036* (2013.01); *D06N 3/0038* (2013.01); *D06N 3/12* (2013.01); *C02F 2101/163* (2013.01); *C02F 2101/203* (2013.01); *C02F 2103/06* (2013.01); *C02F 2103/08* (2013.01); *C02F 2303/16* (2013.01); *D06N 2201/0254* (2013.01); *D06N 2211/30* (2013.01); *Y02P 20/582* (2015.11); *Y02W 10/37* (2015.05)

(58) Field of Classification Search
CPC ............. B01J 20/262; B01J 20/28038; B01J 20/28047; B01J 20/321; B01J 20/3272; B01J 20/3295
USPC ................ 47/59 S, 58.1 R, 58.1 SC
See application file for complete search history.

(56) References Cited

U.S. PATENT DOCUMENTS

| | | | | |
|---|---|---|---|---|
| 6,946,496 | B2* | 9/2005 | Mankiewicz | C08J 9/35 521/50 |
| 7,174,671 | B2* | 2/2007 | Moore | A01G 20/20 47/56 |
| 7,198,431 | B2 | 4/2007 | Gesser | 405/43 |
| 8,430,599 | B2* | 4/2013 | Cook | C05F 9/04 405/128.75 |
| 2003/0121202 | A1* | 7/2003 | Hinsperger | A01G 13/0268 47/9 |
| 2005/0050793 | A1* | 3/2005 | Johnson | A01G 13/0268 47/9 |
| 2005/0204616 | A1* | 9/2005 | Hinsperger | A01G 13/0268 47/9 |
| 2005/0211615 | A1* | 9/2005 | DiLeo | B01J 20/3293 210/198.2 |
| 2009/0031627 | A1* | 2/2009 | Jarmoszuk | A01G 9/021 47/48.5 |
| 2010/0139159 | A1* | 6/2010 | Plate | C08F 251/00 47/58.1 SC |
| 2011/0094967 | A1* | 4/2011 | Glienke | C05D 9/00 210/660 |
| 2011/0179710 | A1 | 7/2011 | Sind | 47/66.7 |
| 2011/0265376 | A1* | 11/2011 | Thrash | C09K 17/22 47/58.1 SC |
| 2011/0289841 | A1* | 12/2011 | Thrash | A01G 7/00 47/59 S |
| 2015/0094448 | A1 | 4/2015 | Banister et al. | C08G 65/2624 |

FOREIGN PATENT DOCUMENTS

| | | | | |
|---|---|---|---|---|
| KR | 200483971 | Y1* | 7/2017 | |
| WO | WO-2012164044 | A1* | 12/2012 | A01G 24/00 |
| WO | WO 2016/154469 | | 9/2016 | A01N 25/10 |

OTHER PUBLICATIONS

"Superabsorbant Hydrogels: A Study of the Most Effective Application of Cross-linked Polyacrylamide Polymers", May 17, 2013, American Museum of Natural History, retrieved on Mar. 23, 2017 at http://web.archive.org/web/20130517033633/http://www.amnh.or/learn-teach/young-naturalist-awards/winning-essays2/2009-winning-essays/superabsorbent-hydrogels-a-study-of-the-most-effective-application-of-cross-linked-polyacrylamide-polymers> entire document.
PCT Search Report and Written Opinion issued in PCT/US 17/015663 dated Apr. 17, 2017, 9 pgs.
Third Party Observation filed in PCT/US17/015663 dated May 4, 2018, 3 pgs.
International Preliminary Report on Patentability issued in application No. PCT/US2017/015663, dated Aug. 9, 2018 (8 pgs).

* cited by examiner

FIG. 1 – Prior Art
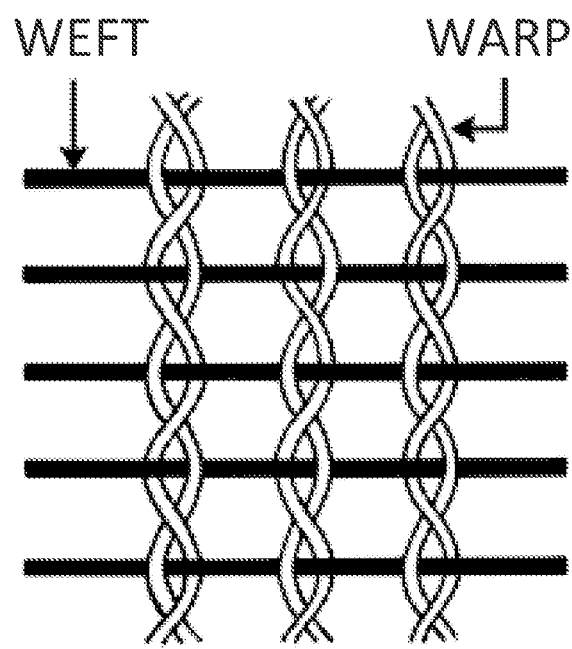
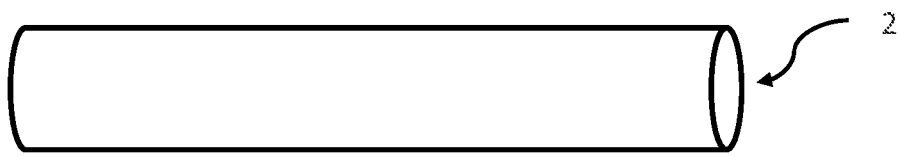
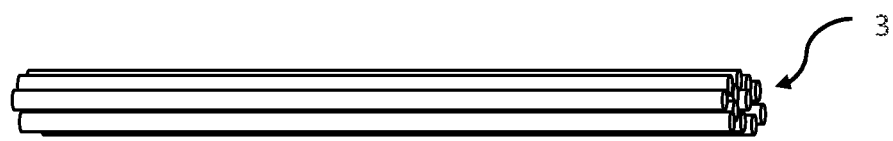

METHOD OF CONSERVING IRRIGATION WATER USING A WOVEN FABRIC SUBSTRATE

This application claims priority from U.S. Provisional Application Ser. No. 62/289,022 filed Jan. 29, 2016, the contents of which are incorporated herein by reference in their entirety.

Water Conservation is of growing importance throughout the world as the growing population is putting more stress than ever on existing water infrastructures and resources. This invention pertains to new types of materials and new approaches to conserve water and remediate already polluted water especially in the agriculture and mining industries. Current water purification technologies such as Reverse Osmosis and Electro Dialysis are expensive to build, are energy and cost prohibitive to operate especially in underdeveloped countries, as well as producing large quantities of brine and wastewater.

A passive or low energy use system of water remediation would greatly reduce the initial up front building costs as well as reduce ongoing operating expense and water waste. The described invention solves cost problems and is highly efficient at conserving and remediating water. Versions of the described invention utilize a polymer hydrogel wherein the polymer is non soluble, is porous and contains either crosslinked or trapped reactive molecules with available electrons and or protons, and/or positive molecular charges, and/or negative molecular charges that alone or in combination attract targeted pollutants. The pollutants can be in water or in the atmosphere or in the ground. The most efficient method we have found is when pollutants are solubilized in water, however this invention works with solvents other than water and is not limited in its scope to use in or with water specifically.

In one embodiment of the invention there is provided a woven fabric formed of fabric fibers or threads coated with a hydrogel, wherein said hydrogel is not crosslinked or is partially crosslinked to the fabric fibers or thread, wherein the hydrogel has a number of excess reactive molecules that are available for a reaction with one or more molecules solvated in an aqueous solution, and wherein the reactive molecules of the hydrogel can reversibly bond with the molecules solvated in an aqueous solution, such that the reactive molecules of the hydrogel attract the molecules solvated in aqueous solution when the hydrogel coated fabric substrate is exposed to an aqueous solution.

In one preferred embodiment the hydrogel may be an epoxy and hydrophilic.

In another preferred embodiment the fabric fibers or thread are made of a synthetic materials selected from the group consisting of polypropylene, polyethylene, polyester, and a copolymer mixtures thereof; or a natural fiber material selected from the group consisting of Jute, Sisal, Hemp, Hessian, cotton, bamboo and a mixture thereof.

In another preferred embodiment the fabric fibers or threads are all of similar size in all of the weave directions, or are of two or more different sizes, wherein at least one size of fabric fibers or thread are woven in one weave direction, and at least one different size of fabric fibers or thread are woven in a different direction to the first size of fabric fibers, or are of two or more different sizes, wherein at least one size of fabric fibers of thread is hydrophilic and a different size of fabric fibers or thread are hydrophobic.

In yet another preferred embodiment, the woven fabric is in a form of a continuous loop belt.

Also provided is a non-woven substrate in a form of fabric fibers or threads coated with a hydrogel, when said hydrogel is not crosslinked or is partially crosslinked to the fabric fibers or thread and includes at least one of the following:

wherein the hydrogel is an epoxy and hydrophilic;

wherein the fabric is made of a synthetic materials selected from the group consisting of polypropylene, polyethylene, polyester, and a copolymer mixture thereof;

wherein the fabric is made of natural fiber material selected from the group consisting of Jute, Sisal, Hemp, Hessian, cotton, bamboo and a mixture thereof; and wherein the substrate is a paper.

In one preferred embodiment, the fabric fibers are all of similar size, or wherein the fabric fibers are of two or more different sizes.

In another preferred embodiment the substrate is perforated in a geometric pattern, removing between 10-90 percent of the substrate, or the substrate is coated in alternating stripes of hydrophilic hydrogel and hydrophobic polymer gel.

In another preferred embodiment, the substrate is in a form of a continuous loop belt.

Also provided is a method of removing solvated molecules from solution and recovering the molecules and the solution separately using a substrate coated with, a porous polymer gel wherein the polymer gel has a number of excess reactive molecules that are available for a reaction with one or more molecules solvated in a solution, and wherein the reactive molecules of the porous polymer gel can reversibly bond with the molecules solvated in a solution, such that the reactive molecules of the polymer gel attract and remove the molecules solvated in solution when the substrate is exposed to the solution and; wherein the removed molecules can be recovered from the substrate and the substrate can be reused once the molecules are recovered.

In one embodiment, the porous polymer gel coated substrate can be further recharged in another solution, and/or wherein the molecules are recovered by one or more electrochemical reaction.

Also provided is a solution remediation system comprising a substrate coated with a hydrogel having excess reactive molecules, wherein the substrate is one or more components of a continuous moving loop belt and the belt is exposed to one or more solutions in at least one tank with an inlet and outlet, the hydrogel excess reactive molecules reversibly bond, attract, adsorb or remove solvated molecules from the solution in the tank, the molecules removed from solution are recovered from the hydrogel coated substrate by exposing the continuous loop belt to another solution in at least one tank or process in sequence with one or more of the following steps:

drying,
heating,
chilling
electrochemical processes,
chemical processes,
rinsing, the excess reactive molecules of the hydrogel coated substrate are recharged by at least one of the following;

drying,
heating,
chilling
electrochemical processes,
chemical processes,
rinsing, and the excess reactive molecule hydrogel coated substrate continuous loop belt is re-exposed to solution to be remediated.

In one embodiment the continuous moving loop belt is exposed to evaporation chamber wherein the solution is evaporated from continuous belt, cooled and condensed to recover the solution.

In one preferred embodiment the solvated molecules to be recovered consist of one or more salts, metals, ions, cations, carbons, CO2, acids, bases, ammonia, nitrates, nitrites, phosphorus, potassium, oil In another preferred embodiment the inlet has a positive and negative electrodes in electrical connection with a power source and placed before the tank inlet on opposite sides of a tube made of ion separator material attached to the inlet, and/or wherein the one or more tanks have two or more electrodes in electrical connection with a power source and said tank has at least one ion separator isolating at least one electrode from the other, and/or wherein the electrochemical process has a positive and negative electrode placed on opposite sides of the continuous belt, wherein a charge applied to the electrodes generate a charge dynamic that attracts and releases the molecules recovered from solution by said continuous loop belt.

Also provided is a passive solution remediation system wherein a substrate of fibers running predominately in one direction and coated with a hydrogel are placed in such a manner that one end of the substrate is placed in a solution to be remediated and the opposite end is placed in a collection container at a lower level than the solution to be remediated and allowed to siphon or wick the solution from the higher elevated solution down to the lower solution container, and wherein the polymer coated substrate preferably is placed inside a tube to stop evaporation of the solution from the hydrogel coated fibers.

Also provided is a method of conserving irrigation water comprising placing a substrate coated with a polymer gel below the soil surface or planting media surface of one or more plants at a depth ranging from one tenth (0.10) of an inch to forty-eight (48) inches deep, preferably at a depth ranging between one and three inches deep and wherein the substrate is coated with a polymer gel that is hydrophilic, the polymer gel coated substrate has openings for plant roots to grow through, the polymer gel coated substrate allows irrigation water to pass through it when plant is being irrigated, and then slows down the rate of water evaporation from the soil or planting media.

In one preferred embodiment the polymer gel coating the substrate contains excess reactive molecules that adsorb, bond or attract at least one dissolved fertilizer chemical component.

In another preferred embodiment the woven fabric has an open weave with 1-100 threads per inch, and preferably an open weave of between 2 and 14 threads per inch and coated with a hydrogel.

In yet another preferred embodiment the non-woven substrate fabric is perforated to remove a range of 10-90 percent of the substrate, preferably 30-60 percent of the substrate and coated with a hydrogel.

In yet another embodiment there is provided a sub soil surface installed irrigation water conservation system comprising a woven fabric or a non-woven substrate of as above described, having at least one length of drip irrigation tubing attached or in contact with the fabric or substrate in fluid connection with the irrigation system.

Further features and advantages of the present invention can be seen from the following detailed description, taken in conjunction with the accompanying drawings:

FIG. 1 illustrates conventional weaving components;

The following description shows several possible versions of materials, types, methods and uses of the disclosed invention.

Starting with FIG. 1 detail is shown of the possible weaving components known in the weaving industry as the weft and warp each component can be of similar or different thread and filament type in order to add specific functionality such as flexibility in the bias or angular direction. Another example would be to design the water wicking directionality into the fabric. For example in a preferred embodiment of the invention the weft component is a multifilament thread coated with a hydrophilic polymer hydrogel as shown in FIG. 3 while the warp uses a monofilament thread shown in FIG. 102 that is not coated. The coated multifilament thread allows superior wetting and water to travel easily along its length while the water has a much more difficult time traveling along the warp or monofilament thread.

Figure 2:
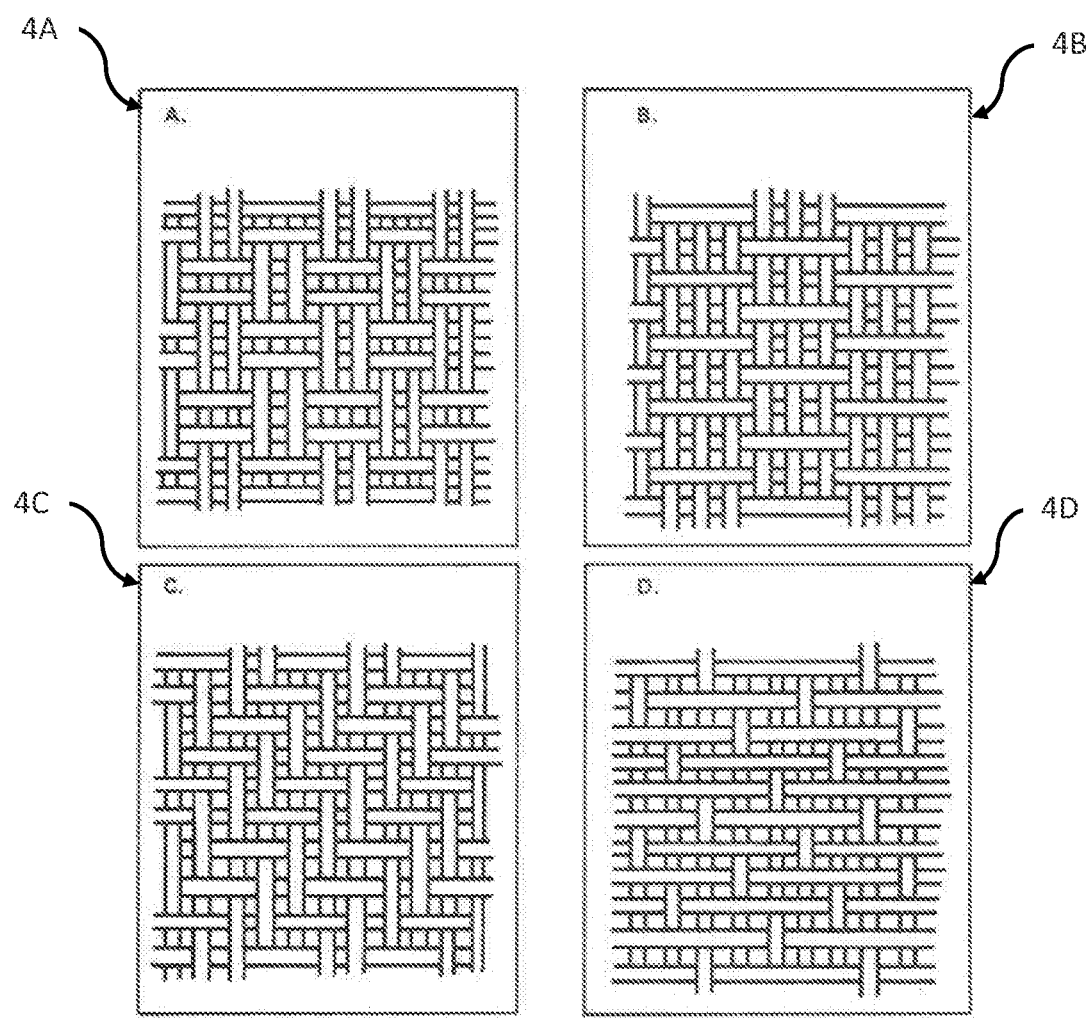
FIG. 2 illustrates preferred weaves in accordance with the present invention.

FIG. 2 depicts several possible weave patterns as shown in 4A, 4B, 4C and 4D. While the weave pattern will impart certain attributes such as strength or flexibility in a particular direction, the invention described is not limited by any particular weave pattern. In agriculture or landscape use, the open area of the weave is very important as it dictates the performance of the material as it slows down the water evaporation from the soil. If the open area is too large the water evaporates faster and if the open area is to small it stops evaporation and keeps the plant roots to wet. The ability of plant roots to penetrate through the weave of the material is also of importance and weaves with a thread counts of 6 to 12 per inch offer the optimum performance of both factors. The thread materials dictate the long term in ground stability of the materials, natural threads such as Jute and cotton will eventually deteriorate and degrade over time while synthetic thread materials such as polyester and polyethylene will last many years longer, there are advantages in both for certain applications so the materials used may be many and varied.

Figure 3A:
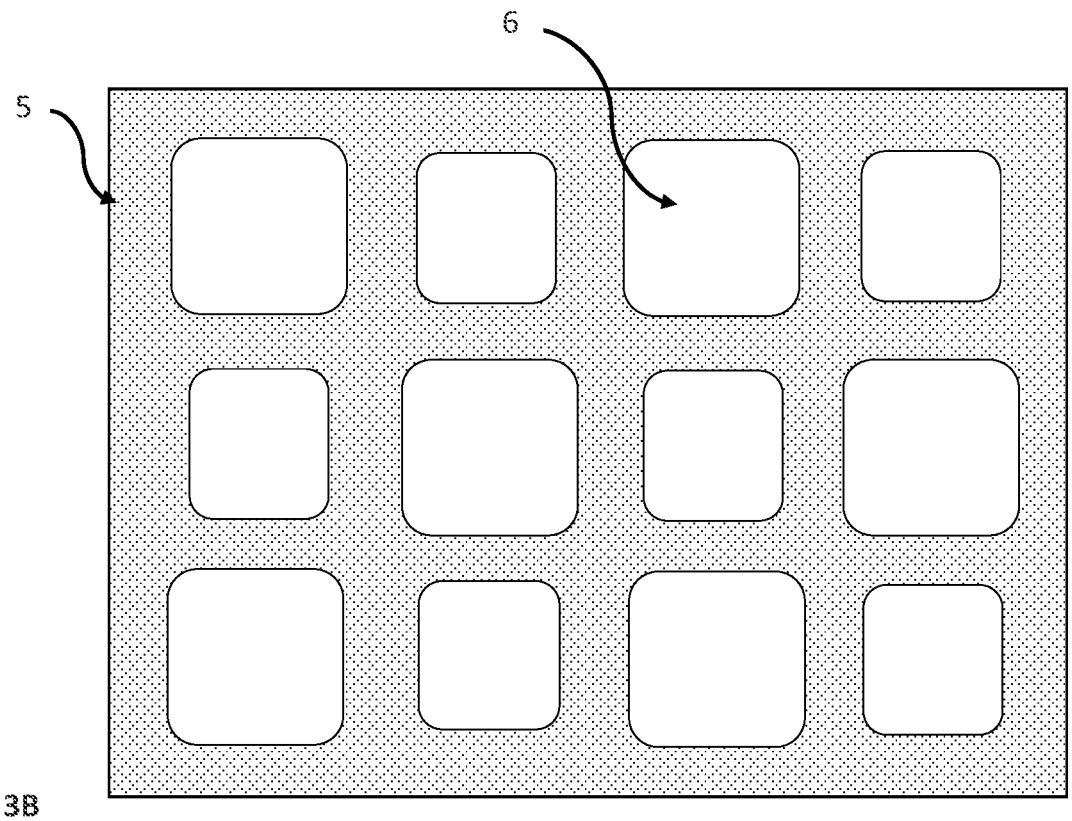
FIGS. 3A and 3B illustrate two embodiments of perforated non-woven material in accordance with the present invention.
Figure 3B:
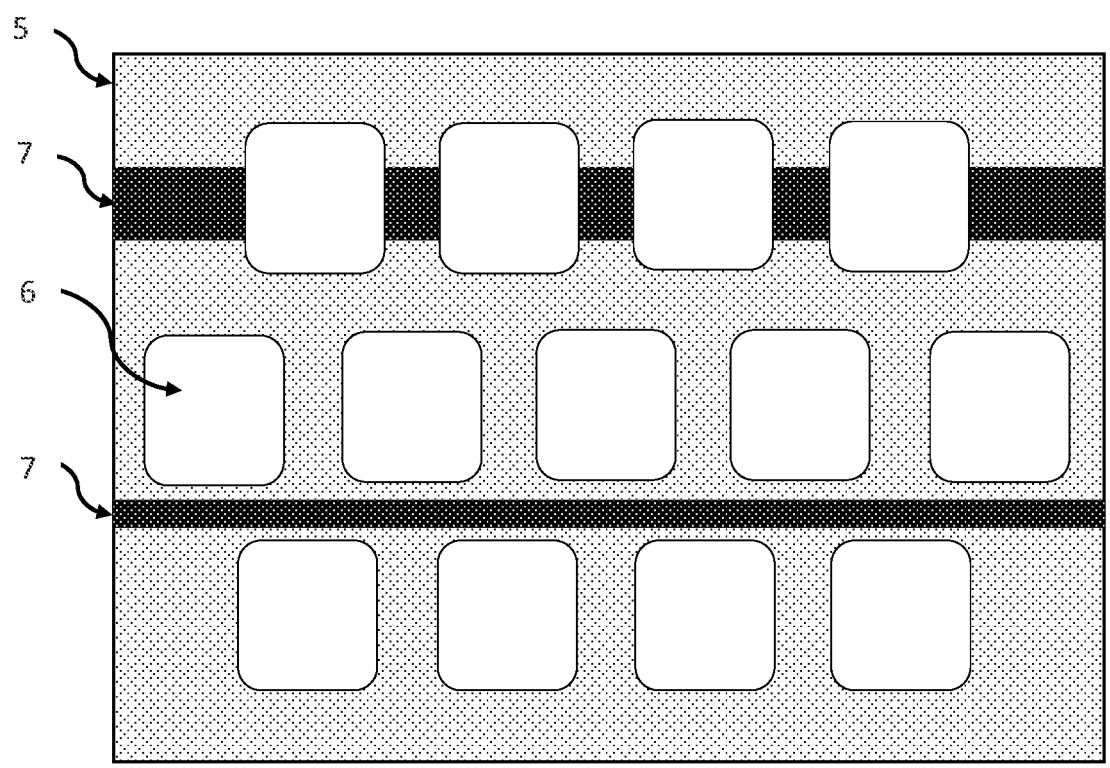

FIG. 3 depicts two preferred embodiments of perforated non-woven material or fabric coated with polymer gels. Non-woven materials or fabrics are typically manufactured by putting small fibers together in the form of a sheet or web similar to paper on a paper machine, and then binding them either mechanically as in the case of felt, by interlocking them with serrated needles such that the inter-fiber friction results in a stronger fabric, with an adhesive, or thermally by applying binder in the form of powder, paste, or polymer melt and melting the binder onto the web by increasing temperature. The non-woven material in FIG. 3A is perforated using a geometric shape, as shown in FIG. 3A, of two different sizes and then coated with a hydrophilic polymer hydrogel. The perforations allow plant roots to penetrate through the non-woven material as without the perforations, the non-woven material will not let the plant roots to penetrate or if the material is made so thin that the plant roots can penetrate the non-woven material lacks the structural strength needed to sustain its shape in the ground. FIG. 3B shows examples of a non-woven material coated with stripes of hydrophobic polymer gel and stripes of hydrophilic polymer gel FIG. 3B for the purpose of imparting wicking directionality to the material. This is important if the non-woven material is installed on a slope below the soil surface, the stripes of hydrophobic polymer gel would be installed to run latitudinally across the slope in order to stop water from wicking uncontrolled to the bottom of the slope and running out due to gravity.

Figure 4:
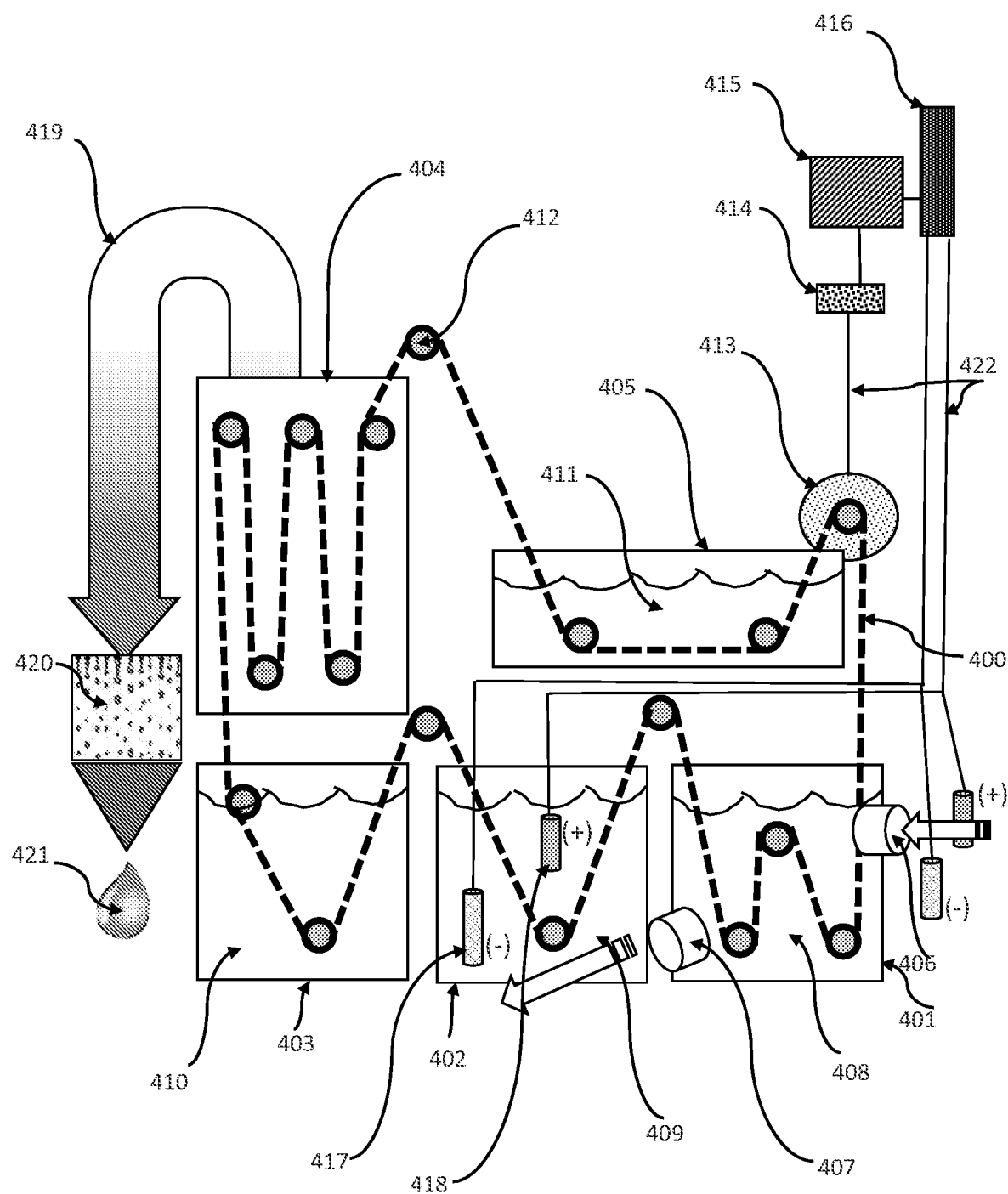
FIG. 4 illustrates a preferred continuous loop of remediation system in accordance with the present invention.

FIG. 4 depicts another preferred embodiment of the disclosed invention wherein the hydrogel coated material is in the form of a continuous loop belt, shown as FIG. 4. The continuous loop belt is a component of a solution processing system wherein the polymer hydrogel's excess reactive molecules are used to remove or separate molecules from a solution. The solution being processed is contained in a tank, 401 that has an inlet 406 and an outlet 407, the continuous loop belt runs through the solution at a speed that allows maximum adsorption and attraction of the target molecules in the solution 408 that is being processed. The continuous loop belt is moved or driven by the motor drive 413 of the system, the motor drive is controlled by a controller 414 that sets or adjusts the speed of the continuous loop belt through the entire system. The controller and motor are powered by a power source shown as 415, the power source also powers the electrochemical controller 416 or a separate power source may be used dependent on the electrochemical processing power needs.

A solution for example, such as water containing iron nitrate, is being processed, it is passed through the first tank with the continuous loop belt, the iron nitrate is adsorbed by the polymer gel excess reactive molecules of the continuous loop belt and the water is now clean and removed. The continuous loop belt is moved into the next tank 402 of the system filled with another solution 409 to solubilize and conduct the iron metal removal from the continuous loop belt. The tank of 402 has two or more electrodes, at least one positive 418 and at least one negative 417 the electrodes are in electrical connection with the electrochemical controller and power source. As the continuous loop belt passes through the tank the Iron metal is deposited on the appropriate electrode and the continuous loop belt exits the tank. The continuous loop belt now enters the next processing tank 403 and is soaked in solution 410 to remove the nitrates, the continuous loop belt then enters an evaporation chamber 404 to evaporate most of the water on the continuous loop belt. The water vapor is collected in a condensation chamber 419 cooled and re-condensed into water 420 and collected as distilled water 421. When the continuous loop belt leaves the evaporation chamber it next enters a recharge tank 405 wherein the continuous loop belts excess reactive molecules are recharged in a solution 411 that matches the chemical charge makeup of the excess reactive molecules that need to be recharged. For example, to recharge amines an ammonia solution works very well. After recharge the continuous loop belt is ready to re-enter the first tank with the solution that is being processed, the continuous loop belt may need to be squeezed between rollers to remove excess ammonia prior to re-entering first tank. The continuous loop belt is driven on and rides on rollers 412 that allow the continuous loop belt to move without friction. In certain processes the described invention may need more or less steps and tanks to be processed and the description is not meant to limit the invention in any way.

Additional electrodes at the inlet side of the tank can be used to attract salts and other cations or ions prior to entering the processing tanks. A preferred embodiment would have an open water source such as a brackish pond the inlet pipe or channel to the first processing tank has a section that is porous to ions such as an ion separator membrane used in batteries, the electrodes are positioned on each side of the ion porous section, at least one positive and at least one negative. The electrodes are controlled by the electrochemical controller and power source. When power is applied, the electrodes attract the cation and ionic salts or other impurities as they travel into the inlet pipe. The ions pass through the ion membrane to the electrodes and are not collected in the inlet. Removing a large portion of dissolved salts from the brackish water entering the system. The high ion concentrate water formed around the electrodes can be kept moving and removed away from the inlet pipe by a pump circulating the pond water.

Figure 5A:
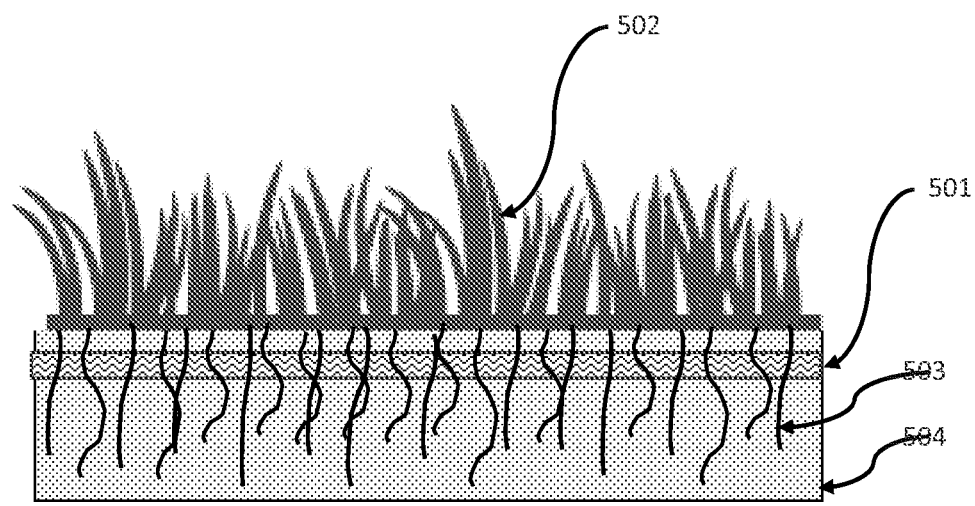
FIGS. 5A and 5B illustrate a water irrigation method conservation system in accordance with the present invention.
Figure 5B:
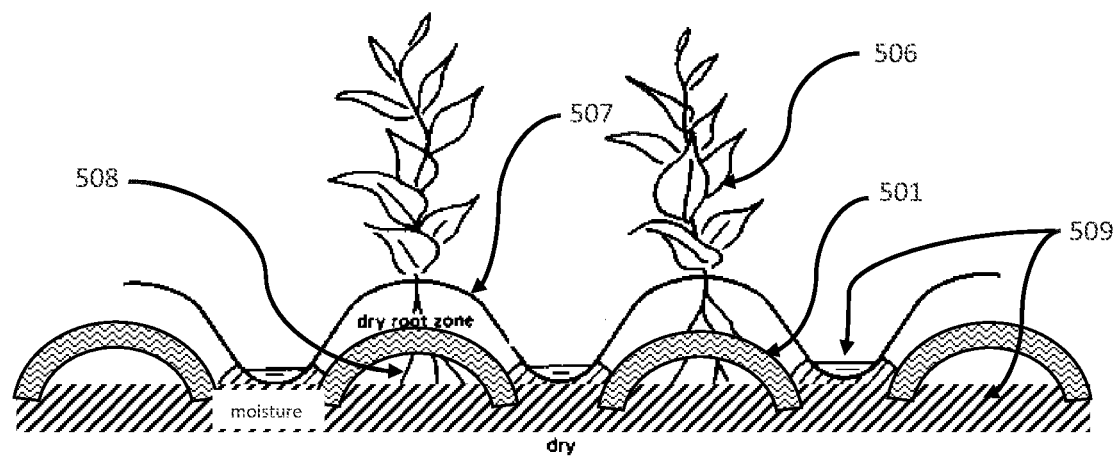

FIG. 5 depicts two more preferred embodiments of the material being used for landscape and agriculture. The hydrogel coated fabric material of the disclosed invention is shown as 501 wherein the hydrogel coated fabric material is placed an inch or so below the surface of a grass lawn 502 and the roots 503 of the lawn or other plants easily penetrate through the material openings, whether the material is woven or non-woven, the roots penetrate deeper into the ground or planting media allowing the lawn above the material to dry while the roots stay moist longer, grow, conserve water and conserve fertilizer below the hydrogel coated fabric material of the disclosed invention.

An agriculture crop plant is depicted as 506 and the drawing shows the crop grown in furrows 507. The hydrogel coated fabric material of the disclosed invention is shown as 501 and placed in such a manner that the crops roots 508 grow through the hydrogel coated fabric material and into the moist soil 509, below the hydrogel coated fabric material in either the woven or non-woven form. The irrigation water travels through the material and evaporates at a slower pace then soil without the material, allowing the water and fertilizer to stay in the plant root zone for the plant to use longer. This conserves irrigation water and conserves fertilizer and demonstrates the purpose and usefulness of the disclosed invention.

Figure 6:
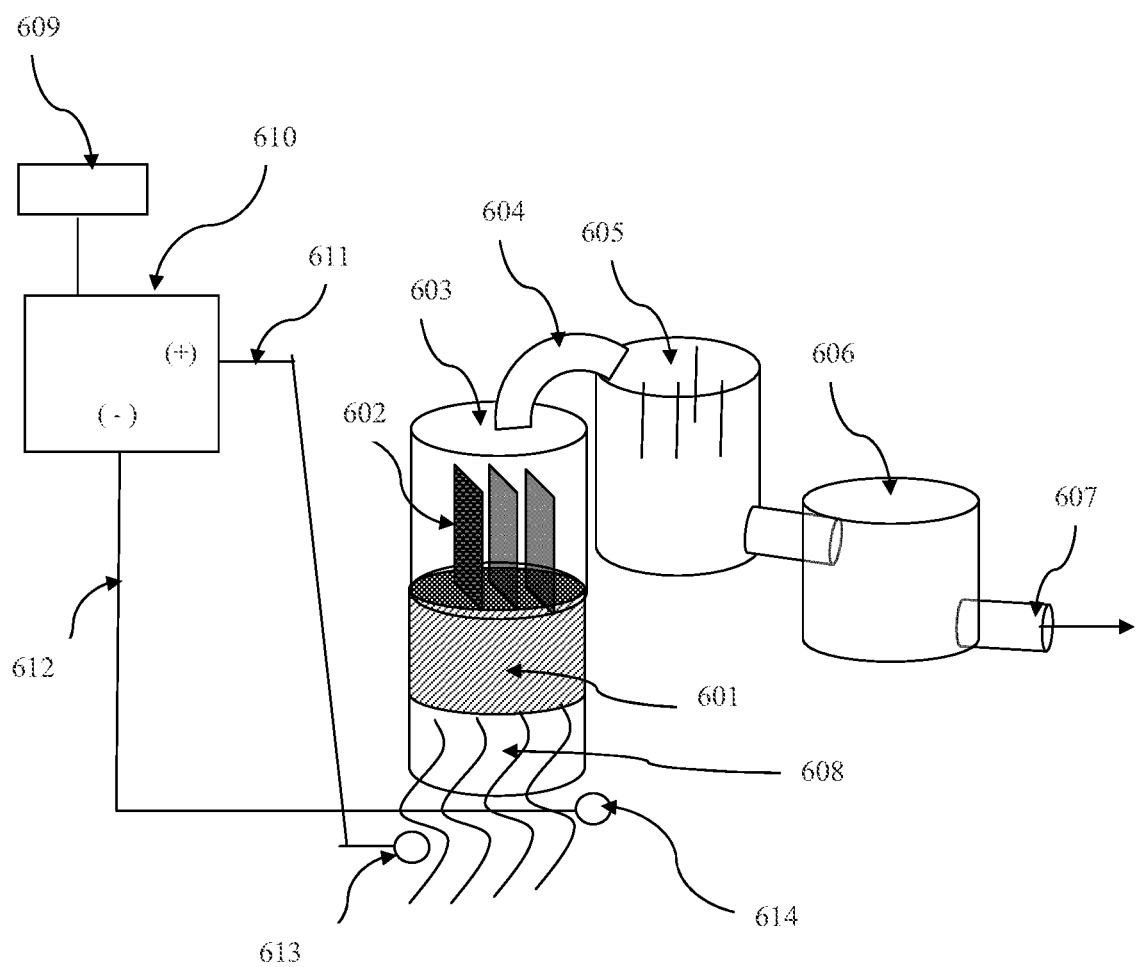
FIG. 6 illustrates a low energy passive water remediation system in accordance with the present invention.

FIG. 6 illustrates a low energy passive water remediation system wherein the only power needed is to facilitate current for the electrochemical electrodes this can be accomplished with very little power. At least one positive electrode 613 in electrical connection 611 and at least one negative electrode. 614 in electrical connection 612 are used to apply electrical current to the pre-water intake 608 in order to isolate soluble ions at each electrode. Power is provided by a power source 609 such as a solar panel and the electrical current is controlled by the controller 610 used to control the electrical current and potential. Water enters evaporation tank shown as 601. Hydrogel coated materials 602 act as wicks with one end submerged in water drawing water into the high surface area of the polymer hydrogel coating of the woven or non-woven fibers to facilitate evaporation. The water vapor is collected in evaporation chamber 603 and travels through pipe 604 to condensation chamber 605 wherein the water vapor cools and condensates back into liquid water to be stored in storage tank 606 where it can be released as clean distilled water through pipe 607

The polymer material is a hydrogel composed of crosslinked polymers and is not soluble in a solvent such as water. The polymer is formulated by crosslinking two or more monomers and or polymers in a method so that once crosslinked they form a 3 dimensional non soluble polymer network. The crosslinking can be accomplished many ways that are well known in the art of polymer chemistry dependent on the polymer chains and reactive molecule species or catalyst used for the crosslinking reaction. Typically, a cross-link is a bond that links one polymer chain to another. They can be covalent bonds or ionic bonds. "Polymer chains" can refer to synthetic polymers or natural polymers (such as proteins). When the term "cross-linking" is used in the synthetic polymer science field, it usually refers to the use of cross-links to promote a difference in the polymers' physical properties. When "crosslinking" is used in the biological field, it refers to the use of a probe to link proteins together to check for protein-protein interactions, as well as other creative cross-linking methodologies.

Cross-linking is used in both synthetic polymer chemistry and in the biological sciences. Although the term is used to refer to the "linking of polymer chains" for both sciences, the extent of crosslinking and specificities of the crosslinking agents vary. Of course, with all science, there are overlaps, and the following delineations are a starting point to understanding the subtleties. When cross links are added to long rubber molecules, the flexibility decreases, the hardness increases and the melting point increases as well.

When polymer chains are linked together by cross-links, they lose some of their ability to move as individual polymer chains. For example, a liquid polymer (such as resin or even melted cheese which contains protein polymers) (where the chains are freely flowing) can be turned into a "solid" or "gel" by cross-linking the chains together.

In polymer chemistry, when a synthetic polymer is said to be "cross-linked", it usually means that the entire bulk of the polymer has been exposed to the cross-linking method. The resulting modification of mechanical properties depends strongly on the cross-link density. Low cross-link densities decrease the viscosities of polymer melts. Intermediate cross-link densities transform gummy polymers into materials that have elastomeric properties and potentially high strengths. Very high cross-link densities can cause materials to become very rigid or glassy, such as phenol-formaldehyde materials.

Cross-links can be formed by chemical reactions that are initiated by heat, pressure, change in pH, or radiation. For example, mixing of an unpolymerized or partially polymerized resin with specific chemicals called crosslinking reagents results in a chemical reaction that forms cross-links. Cross-linking also can be induced in materials that are normally thermoplastic through exposure to a radiation source, such as electron beam exposure, gamma-radiation, or UV light. For example, electron beam processing is used to cross-link the C type of cross-linked polyethylene. Other types of cross-linked polyethylene are made by addition of peroxide during extruding (type A) or by addition of a cross-linking agent (e.g. vinyl-silane) and a catalyst during extruding and then performing a post-extrusion curing. The chemical process of vulcanization is a type of cross-linking that changes rubber to the hard, durable material associated with car and bike tires. This process is often called sulfur curing; the term vulcanization comes from Vulcan, the Roman god of fire. This is, however, a slower process. A typical car tire is cured for 15 minutes at 150° C. However, the time can be reduced by the addition of accelerators such as 2-benzothiazolethiol or tetramethylthiuram disulfide. Both of these contain a sulfur atom in the molecule that initiates the reaction of the sulfur chains with the rubber. Accelerators increase the rate of cure by catalyzing the addition of sulfur chains to the rubber molecules.

Cross-links are the characteristic property of thermosetting plastic materials. In most cases, cross-linking is irreversible, and the resulting thermosetting material will degrade or burn if heated, without melting. Especially in the case of commercially used plastics, once a substance is cross-linked, the product is very hard or impossible to recycle. In some cases, though, if the cross-link bonds are sufficiently different, chemically, from the bonds forming the polymers, the process can be reversed. Permanent hair wave solutions, for example, break and re-form naturally occurring cross-links (disulfide bonds) between protein chains in hair.

Chemical covalent cross-links are stable mechanically and thermally, so once formed are difficult to break. Therefore, cross-linked products like car tires cannot be recycled easily. A class of polymers known as thermoplastic elastomers rely on physical cross-links in their microstructure to achieve stability, and are widely used in non-tire applications, such as snowmobile tracks, and catheters for medical use. They offer a much wider range of properties than conventional cross-linked elastomers because the domains that act as cross-links are reversible, so can be reformed by heat. The stabilizing domains may be non-crystalline (as in styrene-butadiene block copolymers) or crystalline as in thermoplastic co-polyesters. The compound bis (triethoxysilylpropyl)tetrasulfide is a cross-linking agent: the siloxy groups link to silica and the polysulfide groups vulcanize with polyolefins.

Many polymers undergo oxidative cross-linking, typically when exposed to atmospheric oxygen. In some cases, this is undesirable and thus polymerization reactions may involve the use of an antioxidant to slow the formation of oxidative cross-links. In other cases, when formation of cross-links by oxidation is desirable, an oxidizer such as hydrogen peroxide may be used to speed up the process. The process of applying a permanent wave to hair is one example of oxidative cross-linking. In that process the disulfide bonds are reduced, typically using a mercaptan such as ammonium thioglycolate. Following this, the hair is curled and then 'neutralized'. The neutralizer is typically a basic solution of hydrogen peroxide, which causes new disulfide bonds to form under conditions of oxidation, thus permanently fixing the hair into its new configuration.

It is possible to crosslink polymers and leave an excess of one or more unreacted reactive molecules. One example of this would be in an epoxide reaction where there is a ratio of one or more epoxy reactant molecules that is greater than the number of epoxides. After polymerization, this will leave an amount of unreacted reactive molecules used in the polymerization process that have not been used and can be calculated as mathematical ratios. In another epoxide reaction, a branched polymer with reactive molecules that do not react to the epoxide reaction may be mixed into the formulation of the epoxide wherein the branched polymer gets trapped or entangled within the reacted epoxy matrix. Another example would be to add into the epoxy mixture prior to polymerization a reactive molecule or material such as but not limited to activated carbon, Oxides such as of zinc or titanium, clays, nano powders that react with specific pollutants, Amines, Hydrogens, Carboxylates, Hydroxyls, Oxygen, Flourines, Thiols etc. this can additionally be used in reverse where some of the branched polymers are end capped with reactive Amines, Hydrogens, Carboxylates, Hydroxyls, Oxygen, Flourines, Thiols etc. to specifically target molecules in solution. The polymerization reaction can be done several ways such as epoxide reaction, condensation reaction, UV initiated reaction, Thermal reaction etc. and is not meant to limit the scope of the invention. The unreacted molecules that are left after the polymerization reaction or trapped in the polymer matrix are then able to react with water or other solvents and attract the one or more targeted molecules that are being recovered or removed from a solution.

The polymer Hydrogel in a preferred embodiment is applied in liquid form, pre-polymerization to a woven or nonwoven cloth, fabric, paper or other type of flexible substrate. The substrate can be made of natural materials, such as but not limited to cotton, burlap, coconut fibers or Synthetic fiber materials such as but not limited to polypropylene, polyethylene, polyester, and copolymer mixtures are all examples of synthetic fibers that can be used. Materials such as paper, thread or yarn that can additionally be coated with the polymer and stay flexible are preferred.

In another preferred embodiment, Woven mat or cloth with an open weave pattern or PICs Per Inch (PPI) ranging anywhere from but not limited to <1 to 1000 count of yarn and or thread and more specifically to a count of 1 to 12 PPI. The smaller the individual strand in the yarn or woven material the better as this increases surface area of the polymer coating and does not let the polymer break off and become particulate in the solvent solution.

In another preferred embodiment, braided fiber materials like rope and straps that can be used similar to wicks to purify the solvent where the solvent can travel along the length of the material in a desired direction, the polymers reactive molecules react with pollutants of target molecules and ultimately the solvent trickles out of the material in a purified state The larger the porosity of the polymer gel coating on these types of fabrics and materials the faster flowrate and chemical reaction saturation of the polymer coated materials.

In many instances the substrate is specific to the use of the material, in either the woven or nonwoven versions which may be used above or below the soil surface. In another preferred embodiment, the woven fabrics can be used for a landscape irrigation and agricultural irrigation functions. The woven fabric materials can be used as an aid to extend irrigation water dispersion or spread under the ground via the wicking process.

For example, in a preferred embodiment, the open weave provides several important functions, an open weave works best to allow plant root penetration through the mat and retain all the wicking advantages, the amount and formulation of polymer hydrogel coating on the material dictates speed of wicking, moisture retention and fertilizer retention etc., thereby reducing the amount of water needed due to underground water spread and evaporation reduction. The use of fertilizer is reduced due to the reduction of plant nutrients such as Ammonia, Nitrates, Nitrites and Phosphorous leaching through the soil and or running off the soil and into the watershed.

In another embodiment, the open weave also allows directionality of the water/solvent flow or wicking properties by utilizing two different sizes and or types of woven and or nonwoven yarns and threads into or as the weave material components. For example, a fine fiber yarn with many strands that is hydrophilic and or coated with polymer gel is woven as the components running the length of the material and a larger diameter hydrophobic material, that the polymer and or solvent does not coat well, is the lateral component of the weave. This builds directionality into the material, where the wicking properties follow the length of the fine fiber hydrophilic materials but does not follow the thicker weave hydrophobic component that is running angularly and or perpendicularly in the weave. There are many possible combinations of this type of woven materials and combinations and the examples are not meant to limit the scope of possible combinations of the invention.

Nonwoven material substrates can also wick water and solvents, just non-directionally or in all directions since there is no weave pattern. In one preferred embodiment to achieve directionality or application need in a certain area of the material, a pattern can be simply cut into or out of the material. In another embodiment a surfactant or polymer applied to the non-woven material can dictate the directionality of wicking properties by coating some areas of the material with hydrophilic surfactant or polymer coating where water or solvents wick and some areas with hydrophobic surfactants or polymers that inhibit the wicking, for example alternating stripes of hydrophilic and hydrophobic surfactant or polymer can be applied either by printing process and or spraying, stenciling etc., thereby creating wicking stripes across or along the length of the material.

In another embodiment, Hydrophobic surfactant or polymer only is applied to nonwoven hydrophilic material in multiple stripes allowing the material to wick naturally along the non-coated areas of the material or the opposite can be done where a hydrophobic nonwoven material is coated with a hydrophilic surfactant or polymer in stripes and the solvent will follow the hydrophilic stripes.

The ability to control the wicking direction is of particular importance when used on or under a sloped surface where you would want wicking of water to travel horizontally under the ground across the slope for max irrigation and water conservation, if you used the nonwoven material with no directionality under the soil surface irrigation water would follow the slope because the material has no directionality of wicking, the irrigation water would simply end up wicking to the bottom of a slope causing seepage and even mud flow to the bottom of the slope.

In another preferred embodiment, the open weave material is placed just under, preferably 1-3 inches below the soil surface around a plant. The open weave allows irrigation or rain water to penetrate through the mat but then as the polymer coating starts to swell with water it creates a restricted surface and an enhanced condensation area in and under the mat, this process slows down the irrigation water evaporation rate from the soil around the plant and typically conserves over 50% of the irrigation water the plant needs. The polymer coated mats can be used for potted plants, gardens, farms, under turf or sod etc. anywhere that irrigation is used.

In another embodiment, the material has irrigation system, micro irrigation or micro porous tubes attached to it by weaving or sowing or heat sealing, gluing or any other method of attachment of the irrigation water conduit tubing to the woven or nonwoven material in such a way as to allow the material with the irrigation tubes to be roiled up for transport and stocking convenience and then roiled out for installation. The irrigation tubing is situated such that the tubing can be capped or attached, interconnected and or coupled to other tubing at the ends of the roll if the tubing is attached length wise. Alternately the irrigation tubing is situated such that the tubing can be capped or attached, interconnected and or coupled to other tubing along the width of the material. The irrigation tubing delivers water and or water with nutrients to locations on the material the material then allows the water to travel via wicking process to wider areas more efficiently and do not get root bound or plugged up thereby reducing water use and maintenance over an irrigated area.

In another preferred embodiment, the substrate material is made of a natural fiber such as Jute, Sisal, Hemp, Hessian, cotton etc. and or synthetic fibers. The fabric is coated with a hydrogel polymer that has excess reactive molecule sites, via spray, flow or dip tank, the excess polymer is squeezed off by rollers, flexible wiping blades and or squeegees etc. to obtain a specific amount of polymer loaded onto the material per square foot, meter or other measurement and allowed to cure and then re rolled to a specific length and cut off.

In another preferred embodiment, the substrate material is made of a natural fiber such as Jute, Sisal, Hemp, Hessian, cotton etc. and or synthetic fibers. The fabric is coated with a hydrogel polymer that has excess reactive molecule sites and is loaded with a clay, Nano-clay and or other mineral, via spray, flow or dip tank the excess polymer is squeezed off by rollers, flexible wiping blades and or squeegees etc. so that a specific amount of polymer and clay, Nano-clay or other mineral is loaded onto the material per square foot, meter or other measurement and allowed to cure and then re rolled to a specific length and cut off.

In another preferred embodiment, the substrate material is made of a natural fiber such as Jute, Sisal, Hemp, Hessian, cotton etc. and or synthetic fibers. The fabric is coated with a hydrogel polymer that has excess reactive molecule sites and is loaded with a clay and or other mineral, via spray, flow or dip tank the excess polymer is squeezed off by rollers, flexible wiping blades and or squeegees etc. so that a specific amount of polymer and clay or other mineral is loaded onto the material per square foot, meter or other measurement and then allowed to cure and then re rolled to a specific length and cut off. Alternately the clay and or other minerals can be sprayed on after the polymer is applied but prior to curing In another preferred embodiment, the substrate material is made of a natural fiber such as Jute, Sisal, Hemp, Hessian, cotton etc. and or synthetic fibers. The fabric is coated with a hydrogel polymer that has excess reactive molecule sites and is loaded with a clay and or other mineral that has been soaked and or loaded with soil bacteria and or Nitrobacteria and or enzymes, via spray, flow or dip tank the excess polymer is squeezed off by rollers, flexible wiping blades and or squeegees etc. so that a specific amount of polymer and clay or other mineral is loaded onto the material per square foot, meter or other measurement and then allowed to cure and then re rolled to a specific length and cut off. Alternately the clay and or other minerals loaded with bacteria and or nitro bacteria and or enzymes can be sprayed on after the polymer is applied but prior to curing. Once cured the material may contain everything it needs to support plant life over extended periods with or without soil.

In other embodiments fertilizer is added to the polymer matrix by including it in the formulation of the polymer or applying as the polymer is applied to the material substrate. In yet other embodiments fertilizer and or seeds can be applied to the material substrate with or without the clays, minerals, bacterial etc. In yet another embodiment version the pH of the polymer can be adjusted via formulation to a specific range between pH 3-9, more specifically to a range between pH 6-8 and even more specifically to a set pH of 6.0, 6.5, 7.0, 7.5, 8.0 or any number in between these.

In another embodiment, the polymer coated substrate material can be laid out in agriculture runoff areas, catch ponds etc. With the purpose of stripping any fertilizer (Ammonia, Nitrates, Nitrites, Phosphorous, Potassium) out of the runoff water.

In another preferred embodiment, the polymer coated substrate material can be used to remove metals solubilized in water.

In another preferred embodiment, the polymer coated substrate material can be used to remove chemicals solubilized in water.

In another preferred embodiment, the polymer coated substrate material can be used to remove acids solubilized in water an example of this would be carbonic acid or $CO2$ dissolved in sea water.

In another embodiment, the polymer coated substrate material is manufactured as a long continuous belt and or loop that is exposed to the water or solvent or air that is polluted. The pollutant is attracted to the material and removed from the water or solvent or air and then processed so that the belt or loop can be reused. This is accomplished via chemical and or electrochemical processing in solution. Using a chemical or electrochemical process with a stronger charge either in the solution or at an electrode than the belt of material has will encourage the pollutant, metal, chemical or acid to detach from the polymer coated substrate material belt and collect at the stronger charge. This allows for the polymer coated substrate to be reused over and over thereby reducing the cost of the cleanup materials used, and dramatically reduces waste materials and brines when cleaning polluted and or brackish water. This process can be accomplished simultaneously so that a portable multi tank, self-contained unit can be moved to locations where pollution occurs and used as needed or it can be built as a permanent structure with several continuous belts running simultaneously as well as belts with different polymer formulations that remove different pollutants.

Nothing in this description is meant to limit the scope and use of the invention.

The invention claimed is:

1. A method of conserving irrigation water comprising placing a fabric substrate in the form of an open weave woven fabric sheet or woven mat having a thread count of 1 to 100 threads per inch below a soil surface or planting media surface of one or more plants at a depth ranging from one tenth (0.10) of an inch to forty-eight (48) inches deep, wherein the fabric substrate is coated with a polymer gel that is hydrophilic, the polymer gel coated fabric substrate has openings for plant roots to grow through, the polymer gel coated fabric substrate allows irrigation water to pass through openings in the substrate when the one or more plants are being irrigated, and also slows down the rate of water evaporation from the soil or planting media.

2. The method of claim 1 wherein the polymer gel coating the fabric substrate contains excess reactive molecules that adsorb, bond or attract at least one dissolved fertilizer chemical component.

3. The method of claim 1, wherein the polymer gel coated fabric substrate is placed at a depth ranging from one to three inches below the said soil surface or said planting media surface.

* * * * *